(12) United States Patent
Chen

(10) Patent No.: US 6,760,576 B2
(45) Date of Patent: Jul. 6, 2004

(54) METHOD AND APPARATUS FOR ENHANCED RATE DETERMINATION IN HIGH DATA RATE WIRELESS COMMUNICATION SYSTEMS

(75) Inventor: Tao Chen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 636 days.

(21) Appl. No.: 09/818,694

(22) Filed: Mar. 27, 2001

(65) Prior Publication Data

US 2002/0151290 A1 Oct. 17, 2002

(51) Int. Cl.[7] .............................. H04B 7/00; H04J 3/16; H04Q 1/20
(52) U.S. Cl. ...................... 455/266; 455/452.2; 455/72; 370/468; 370/914; 375/225
(58) Field of Search .......................... 455/266, 68, 70, 455/72, 230, 452.2, 517; 370/468, 347, 442, 358, 395.61, 395.65, 914, FOR 142; 375/225, 222, 240, 240.02, 240.07, 130, 377

(56) References Cited

U.S. PATENT DOCUMENTS

| | | | |
|---|---|---|---|
| 4,901,307 A | 2/1990 | Gilhousen et al. | |
| 5,103,459 A | 4/1992 | Gilhousen et al. | |
| 5,414,796 A | 5/1995 | Jacobs et al. | |
| 5,511,073 A | 4/1996 | Padovani et al. | |
| 5,566,206 A | 10/1996 | Butler et al. | |
| 5,673,266 A | * 9/1997 | Li ............................... | 370/465 |
| 5,710,784 A | 1/1998 | Kindred et al. | |
| 5,751,725 A | 5/1998 | Chen | |
| 5,898,696 A | * 4/1999 | Proctor et al. ............... | 370/468 |
| 5,914,950 A | * 6/1999 | Tiedemann et al. ......... | 370/348 |
| 5,974,106 A | * 10/1999 | Dupont et al. ............... | 375/377 |
| 6,175,590 B1 | * 1/2001 | Stein ........................... | 375/225 |
| 6,529,730 B1 | * 3/2003 | Komaili et al. .......... | 455/452.2 |

* cited by examiner

*Primary Examiner*—Duc M. Nguyen
(74) *Attorney, Agent, or Firm*—Philip Wadsworth; Thien T. Nugyen; Maryanne E. DeAngelo

(57) ABSTRACT

In a variable rate wireless communication system, an explicit reduced-bit rate indicator is used to communicate the data rate and configuration of the transmission to the receiver. Data throughput is increased by reducing the number of bits required to indicate data rate and channel configuration. Related allocation of total transmit power, and related receive processing are conserved. Reception is enhanced by increased probability of correct decoding. Receiver performance is enhanced by reducing the probability of false erasures and associated outerloop setpoint adjustment errors when the receiver is notified of channels with zero data rates. Power consumption is reduced by using fewer bits to communicate data rate and channel configuration information, and by more accurate setpoint adjustment.

44 Claims, 9 Drawing Sheets

| CH1 \ CH2 | 0 | 9.6 | 19.2 | 38.4 | 76.8 | 153.6 | 307.2 | 614.4 | 1024 |
|---|---|---|---|---|---|---|---|---|---|
| 0 | RATE COMB. 1 | RATE COMB. 2 | RATE COMB. 3 | RATE COMB. 4 | RATE COMB. 5 | RATE COMB. 6 | RATE COMB. 7 | RATE COMB. 8 | RATE COMB. 9 |
| 9.6 | RATE COMB. 10 | RATE COMB. 11 | RATE COMB. 12 | RATE COMB. 13 | RATE COMB. 14 | RATE COMB. 15 | RATE COMB. 16 | RATE COMB. 17 | RATE COMB. 18 |
| 19.2 | RATE COMB. 19 | RATE COMB. 20 | RATE COMB. 21 | RATE COMB. 22 | RATE COMB. 23 | RATE COMB. 24 | RATE COMB. 25 | RATE COMB. 26 | RATE COMB. 27 |
| 38.4 | RATE COMB. 28 | RATE COMB. 29 | RATE COMB. 30 | RATE COMB. 31 | RATE COMB. 32 | RATE COMB. 33 | RATE COMB. 34 | RATE COMB. 35 | RATE COMB. 36 |
| 76.8 | RATE COMB. 37 | RATE COMB. 38 | RATE COMB. 39 | RATE COMB. 40 | RATE COMB. 41 | RATE COMB. 42 | RATE COMB. 43 | RATE COMB. 44 | RATE COMB. 45 |
| 153.6 | RATE COMB. 46 | RATE COMB. 47 | RATE COMB. 48 | RATE COMB. 49 | RATE COMB. 50 | RATE COMB. 51 | RATE COMB. 52 | RATE COMB. 53 | RATE COMB. 54 |
| 307.2 | RATE COMB. 55 | RATE COMB. 56 | RATE COMB. 57 | RATE COMB. 58 | RATE COMB. 59 | RATE COMB. 60 | RATE COMB. 61 | RATE COMB. 62 | RATE COMB. 63 |
| 614.4 | RATE COMB. 64 | RATE COMB. 65 | RATE COMB. 66 | RATE COMB. 67 | RATE COMB. 68 | RATE COMB. 69 | RATE COMB. 70 | RATE COMB. 71 | RATE COMB. 72 |
| 1024 | RATE COMB. 73 | RATE COMB. 74 | RATE COMB. 75 | RATE COMB. 76 | RATE COMB. 77 | RATE COMB. 78 | RATE COMB. 79 | RATE COMB. 80 | RATE COMB. 81 |

7 BITS REQUIRED FOR 81 RATE COMBINATIONS

| CH1 \ CH2 | 0 | 9.6 | 19.2 | 38.4 | 76.8 | 153.6 | 307.2 | 614.4 | 1024 |
|---|---|---|---|---|---|---|---|---|---|
| 0 | RATE COMB. X | RATE COMB. X | RATE COMB. X | RATE COMB. X | RATE COMB. X | RATE COMB. X | RATE COMB. X | RATE COMB. X | RATE COMB. X |
| 9.6 | RATE COMB. X | RATE COMB. 1 | RATE COMB. 2 | RATE COMB. 3 | RATE COMB. 4 | RATE COMB. 5 | RATE COMB. 6 | RATE COMB. 7 | RATE COMB. 8 |
| 19.2 | RATE COMB. X | RATE COMB. 9 | RATE COMB. 10 | RATE COMB. 11 | RATE COMB. 12 | RATE COMB. 13 | RATE COMB. 14 | RATE COMB. 15 | RATE COMB. 16 |
| 38.4 | RATE COMB. X | RATE COMB. 17 | RATE COMB. 18 | RATE COMB. 19 | RATE COMB. 20 | RATE COMB. 21 | RATE COMB. 22 | RATE COMB. 23 | RATE COMB. 24 |
| 76.8 | RATE COMB. X | RATE COMB. 25 | RATE COMB. 26 | RATE COMB. 27 | RATE COMB. 28 | RATE COMB. 29 | RATE COMB. 30 | RATE COMB. 31 | RATE COMB. 32 |
| 153.6 | RATE COMB. X | RATE COMB. 33 | RATE COMB. 34 | RATE COMB. 35 | RATE COMB. 36 | RATE COMB. 37 | RATE COMB. 38 | RATE COMB. 39 | RATE COMB. 40 |
| 307.2 | RATE COMB. X | RATE COMB. 41 | RATE COMB. 42 | RATE COMB. 43 | RATE COMB. 44 | RATE COMB. 45 | RATE COMB. 46 | RATE COMB. 47 | RATE COMB. 48 |
| 614.4 | RATE COMB. X | RATE COMB. 49 | RATE COMB. 50 | RATE COMB. 51 | RATE COMB. 52 | RATE COMB. 53 | RATE COMB. 54 | RATE COMB. 55 | RATE COMB. 56 |
| 1024 | RATE COMB. X | RATE COMB. 57 | RATE COMB. 58 | RATE COMB. 59 | RATE COMB. 60 | RATE COMB. 61 | RATE COMB. 62 | RATE COMB. 63 | RATE COMB. 64 |

6 BITS REQUIRED FOR 64 RATE COMBINATIONS

| CH1 \ CH2 | 0 | 9.6 | 19.2 | 38.4 | 76.8 | 153.6 | 307.2 | 614.4 | 1024 |
|---|---|---|---|---|---|---|---|---|---|
| 0 | RATE COMB. X | RATE COMB. X | RATE COMB. X | RATE COMB. X | RATE COMB. X | RATE COMB. X | RATE COMB. X | RATE COMB. X | RATE COMB. X |
| 9.6 | RATE COMB. X | RATE COMB. 1 | RATE COMB. 2 | RATE COMB. 3 | RATE COMB. 4 | RATE COMB. 5 | RATE COMB. 6 | RATE COMB. 7 | RATE COMB. 8 |
| 19.2 | RATE COMB. X | RATE COMB. 9 | RATE COMB. 10 | RATE COMB. 11 | RATE COMB. 12 | RATE COMB. 13 | RATE COMB. 14 | RATE COMB. 15 | RATE COMB. 16 |
| 38.4 | RATE COMB. X | RATE COMB. 17 | RATE COMB. 18 | RATE COMB. 19 | RATE COMB. 20 | RATE COMB. 21 | RATE COMB. 22 | RATE COMB. 23 | RATE COMB. 24 |
| 76.8 | RATE COMB. X | RATE COMB. 25 | RATE COMB. 26 | RATE COMB. 27 | RATE COMB. 28 | RATE COMB. 29 | RATE COMB. 30 | RATE COMB. 31 | RATE COMB. 32 |
| 153.6 | RATE COMB. X | RATE COMB. 33 | RATE COMB. 34 | RATE COMB. 35 | RATE COMB. 36 | RATE COMB. 37 | RATE COMB. 38 | RATE COMB. 39 | RATE COMB. 40 |
| 307.2 | RATE COMB. X | RATE COMB. 41 | RATE COMB. 42 | RATE COMB. 43 | RATE COMB. 44 | RATE COMB. 45 | RATE COMB. 46 | RATE COMB. 47 | RATE COMB. 48 |
| 614.4 | RATE COMB. X | RATE COMB. 49 | RATE COMB. 50 | RATE COMB. 51 | RATE COMB. 52 | RATE COMB. 53 | RATE COMB. 54 | RATE COMB. 55 | RATE COMB. 56 |
| 1024 | RATE COMB. X | RATE COMB. 57 | RATE COMB. 58 | RATE COMB. 59 | RATE COMB. 60 | RATE COMB. 61 | RATE COMB. 62 | RATE COMB. 63 | RATE COMB. 64 |

METHOD AND APPARATUS FOR ENHANCED RATE DETERMINATION IN HIGH DATA RATE WIRELESS COMMUNICATION SYSTEMS

BACKGROUND

1. Field

The disclosed embodiments relate to communications. More particularly, the disclosed embodiments relate to a method and apparatus for transmitting and receiving variable rate packets of data with signals indicative of the data rate of those packets.

2. Background

The use of Code Division Multiple Access (CDMA) modulation techniques is one of several techniques for facilitating communications in which a large number of system users are present. Although other techniques such as Time Division Multiple Access (TDMA), Frequency Division Multiple Access (FDMA), and AM modulation schemes such as Amplitude Companded Single Sideband (ACSSB) are known, CDMA has significant advantages over these other techniques. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present invention, and incorporated by reference herein.

CDMA systems often employ a variable rate encoding of data so that the data rate can be varied from one data frame to another. An exemplary embodiment of variable rate encoding is described in U.S. Pat. No. 5,414,796, entitled "VARIABLE RATE VOCODER," assigned to the assignee of the present invention, and incorporated by reference herein. The use of a variable rate communications channel reduces mutual interference by eliminating unnecessary transmissions when there is no useful data to be transmitted. Algorithms are utilized during encoding for generating a varying number of information bits in each frame in accordance with variations in data activity. For example, an encoder of a cdma2000 1xEV-DV system may produce 20 millisecond (ms) data frames containing 0, 168, 360, 744, 1512, 3048, 6120, 12264, or 20456 bits of data, for transmission on the reverse link. It is desired to transmit each data frame in a fixed amount of time by varying the transmission rate of communications.

Additional details on the formatting of the data into data frames are described in U.S. Pat. No. 5,511,073, entitled "METHOD AND APPARATUS FOR THE FORMATTING OF DATA FOR TRANSMISSION," assigned to the assignee of the present invention, and incorporated herein by reference. The data frames may be further processed, spread spectrum modulated, and transmitted as described in U.S. Pat. No. 5,103,459, entitled "SYSTEM AND METHOD FOR GENERATING WAVEFORMS IN A CDMA CELLULAR TELEPHONE SYSTEM," assigned to the assignee of the present invention, and incorporated by reference herein.

Variable rate systems can be developed which include explicit rate information. If the rate is included as part of a variable rate frame, then the rate is not recoverable until after the frame has already been properly decoded, at which point the rate has already been determined. Rather than including the rate in the variable rate frame, the rate could instead be sent in a non-variable rate portion of the frame. However, only a few bits are typically needed to represent the rate, and these bits cannot be efficiently encoded and interleaved in order to provide error protection for fading communications channels. Furthermore, the rate information is only available after some decoding delay or subject to error.

Alternatively, variable rate systems can be developed which do not include explicit rate information. One technique for the receiver to determine the rate of a received data frame where the rate information is not explicitly included in the frame is described in U.S. patent application No. 5,566,206, entitled "METHOD AND APPARATUS FOR DETERMINING DATA RATE OF TRANSMITTED VARIABLE RATE DATA IN A COMMUNICATIONS RECEIVER," assigned to the assignee of the present invention, and incorporated by reference herein. Another technique is described in U.S. Pat. No. 5,710,784, entitled "MULTIRATE SERIAL VITERBI DECODER FOR CODE DIVISION MULTIPLE ACCESS SYSTEM APPLICATIONS," assigned to the assignee of the present invention, and incorporated herein by reference. According to these techniques, known as blind decoding, each received data frame is decoded at each of the possible rates. Error metrics, which describe the quality of the decoded symbols for each frame decoded at each rate, are provided to a processor. The error metrics may include Cyclic Redundancy Check (CRC) results, Yamamoto Quality Metrics, and Symbol Error Rates. These error metrics are well-known in communications systems. The processor analyzes the error metrics and determines the most probable rate at which the incoming symbols were transmitted.

Decoding each received data frame at each possible data rate will eventually generate the desired decoded data. However, the search through all possible rates is not the most efficient use of processing resources in a receiver. Also, as higher transmission rates are used, power consumption for determining the transmission rate also increases because there are more bits per frame to be processed. Furthermore, as technology evolves, variable rate systems may utilize larger sets of data rates for communicating information. The use of larger sets of rates will make the exhaustive decoding at all possible rates infeasible. The decoding delay will not be tolerable for some system applications. Consequently, there is a need for a more efficient explicit rate determination system in a high data rate variable rate communications environment.

SUMMARY

Embodiments disclosed herein address the above-stated needs by providing an efficiency enhanced rate determination system for a high data rate variable rate communications environment. In one aspect, in a variable rate wireless communication system having at least a first channel and a second channel, a method for explicitly indicating data rate information includes generating a frame of data from data present on the at least first and second channels, determining a set of all possible data rate combinations for the at least first and second channels, determining a subset of authorized data rate combinations and a subset of unauthorized data rate combinations from the set of all possible data rate combinations, selecting a data rate combination to represent the data present on the at least first and second channels from the subset of unauthorized data rate combinations to represent a data rate combination with at least one zero data rate, and transmitting an indicator of the selected data rate combination and the frame of data.

In another aspect, in a variable rate wireless communication system having at least a first channel and a second channel, a method for explicitly indicating data rate information includes generating a frame of data from data present on the at least first and second channels, determining a set of all possible data rate combinations for the at least first and second channels, determining a subset of authorized data rate combinations and a subset of unauthorized data rate combinations from the set of all possible data rate combinations, selecting a data rate combination with a maximum data rate to represent a channel data rate combination with a zero data rate when the maximum rate is authorized on the zero rate channel, and transmitting an indicator of the selected data rate combination and the frame of data.

In another aspect, in a variable rate wireless communication system having at least a first channel and a second channel, a method for decoding received data using explicit data rate indication information includes receiving a frame of data comprising data present on the at least first and second channels and a rate combination indictor indicating a data rate for the at least first and second channels, determining a set of all possible data rates for the at least first and second channels, determining a subset of authorized data rates and a subset of unauthorized data rates from the set of all possible data rates for the at least first and second channels, and processing a channel having an unauthorized data rate as a zero rate channel, without declaring an erasure or adjusting the setpoint.

In yet another aspect, in a variable rate wireless communication system having at least a first channel and a second channel, a method for decoding received data using explicit data rate indication information includes receiving a frame of data comprising data present on the at least first and second channels and a rate combination indictor indicating a data rate for the at least first and second channels, determining a set of all possible data rates for the at least first and second channels, determining a subset of authorized data rates and a subset of unauthorized data rates from the set of all possible data rates for the at least first and second channels, processing a channel having an authorized data rate and no recovered data by measuring the signal to noise ratio and comparing the ratio to a threshold determined by the indicated rate, and processing a channel where the ratio is below the threshold as a zero rate channel, without declaring an erasure or adjusting the setpoint.

In still another aspect, a base station being configured to encode a signal for transmission includes, a transmitter, the transmitter capable of transmitting variable rate data signals between a base station and a remote terminal, and a processor communicatively coupled to the transmitter and configured to: generate a frame of data from data present on the at least first and second channels, determine a set of all possible data rate combinations for the at least first and second channels, determine a subset of authorized data rate combinations and a subset of unauthorized data rate combinations from the set of all possible data rate combinations, select a data rate combination to represent the data present on the at least first and second channels from the subset of unauthorized data rate combinations to represent a data rate combination with at least one zero data rate, select a data rate combination with a maximum data rate to represent a channel data rate combination with a zero data rate when the maximum rate is authorized on the zero rate channel, and transmit an indicator of the selected data rate combination and the frame of data.

In another aspect, a remote terminal configured to receive a transmitted signal includes a receiver, the receiver capable of receiving variable rate data signals from a base station, and a processor communicatively coupled to the transmitter and configured to: receive a frame of data comprising data present on the at least first and second channels and a rate combination indictor indicating a data rate for the at least first and second channels, determine a set of all possible data rates for the at least first and second channels, determine a subset of authorized data rates and a subset of unauthorized data rates from the set of all possible data rates for the at least first and second channels, process a channel having an unauthorized data rate as a zero rate channel, without declaring an erasure or adjusting the setpoint, process a channel having an authorized data rate and no recovered data by measuring the signal to noise ratio and comparing the ratio to a threshold determined by the indicated rate, and process a channel where the ratio is below the threshold as a zero rate channel, without declaring an erasure or adjusting the setpoint.

In another aspect, a variable rate wireless communications system includes a base station for encoding and transmitting data with a reduced-bit rate combination indicator explicitly indicating the rate of the data, and a remote terminal for receiving and decoding data using the reduced-bit rate combination indicator without declaring erasures or adjusting the setpoint when processing a channel with a zero data rate.

BRIEF DESCRIPTION OF THE DRAWINGS

FIG. 2 illustrates exemplary rate indication combinations for high data rate reverse link supplemental channels;

FIG. 3 illustrates an exemplary embodiment of reduced-bit rate indication combinations for the supplemental channels of FIG. 2;

FIG. 4 illustrates an exemplary embodiment of an authorized rate space of the reduced-bit rate indication combinations of FIG. 3;

DETAILED DESCRIPTION

Figure 1:
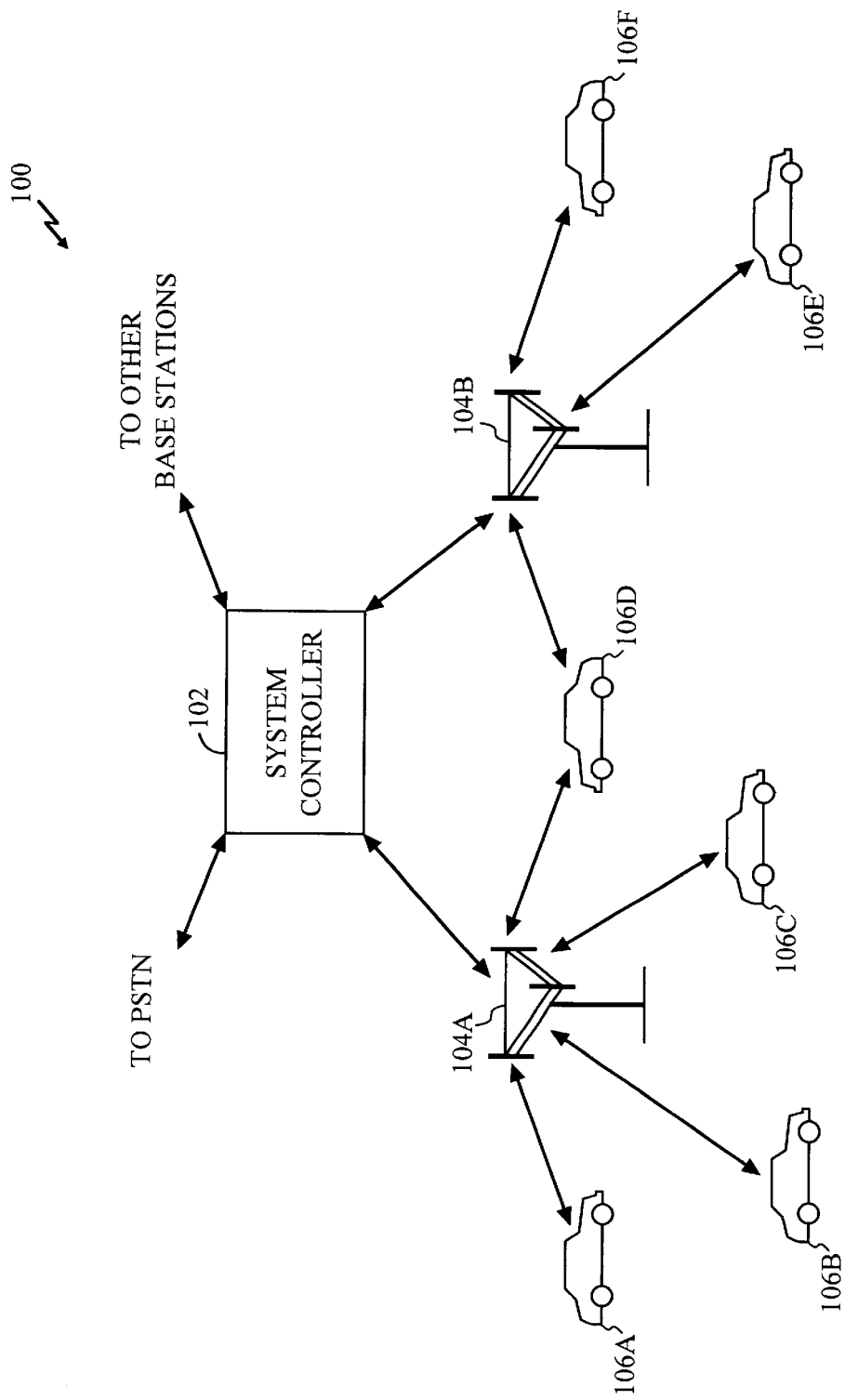
FIG. 1 is a diagram of a spread spectrum communication system capable of supporting a number of high data rate users.

In a wireless communication system, a user with a remote terminal communicates with another user via transmissions on the forward and reverse links with one or more base stations. A remote terminal may comprise a cellular telephone for mobile subscribers, a cordless telephone, a paging device, a wireless local loop device, a personal digital assistant (PDA), an Internet telephony device, a component of a satellite communication system, or any other component device of a communications system. The forward link refers to transmission from the base station to the remote terminal, and the reverse link refers to transmission from the remote terminal to the base station. The forward and reverse links are typically allocated different frequency bands.

In a Code Division Multiple Access (CDMA) system, the total transmit power from a base station is typically indicative of the total capacity of the forward link since data may be transmitted to a number of users concurrently over a shared frequency band. A portion of the total transmit power may be allocated to each active user such that the total aggregate transmit power for all users is less than or equal to the total available transmit power. The reverse link of a CDMA system, on the other hand, is typically operated with a finite amount of total received power so as to ensure adequate data throughput and operating distance from the base station for remote terminals whose output power is limited.

To maximize the forward or reverse link capacity in a CDMA system, the transmit power of a transmitter may be controlled by a first power control loop, or open loop, such that the signal quality, as measured by the energy-per-bit-to-total-noise-plus-interference ratio ($E_b/N_t$), of a transmission received at the receiver is maintained at a particular target $E_b/N_t$. This target $E_b/N_t$ is often referred to as the power control setpoint (or simply, the setpoint). A second power control loop, or closed loop, is typically employed to adjust the setpoint such that a desired level of performance, e.g., as measured by the Frame Error Rate (FER), is maintained. The power control mechanism thus attempts to reduce power consumption and interference while maintaining the desired link performance. This results in increased system capacity and reduced delays in serving users.

In a conventional implementation, the setpoint is adjusted based on the status of received data frames (or packets). In one scheme, the setpoint is increased by a relatively large step (e.g., $\Delta U=1$ dB) whenever a frame erasure is detected (i.e., the frame is received in error). Conversely, the setpoint is decreased by a smaller step (e.g., $\Delta D=0.01$ dB) whenever a frame is properly decoded. For this scheme, the frame error rate is approximately equal to the ratio of the "down" step over the "up" step (i.e., $FER=\Delta D/(\Delta D+\Delta U)$).

The setpoint adjustment scheme described above results in a sawtooth response for the setpoint. This sawtooth response may result in transmission at a higher power level than necessary since the setpoint can only be decreased in small steps. Moreover, accurate adjustment of the setpoint to reflect changing link conditions is hindered by erroneous step up adjustments caused by zero rate frames processed as erasures. The disclosed embodiments provide a method of rate determination using a reduced-bit rate indicator and a reduced probability of erroneous setpoint adjustments, thus reducing receive processing, power consumption, and interference, further increasing system capacity.

FIG. 1 is a diagram of a spread spectrum communication system 100 that supports a number of users. System 100 provides communication for a number of cells, with each cell being serviced by a corresponding base station 104. Various remote terminals 106 are dispersed throughout the system. Each remote terminal 106 may communicate with one or more base stations 104 on the forward and reverse links at any particular moment, depending on whether or not the remote terminal is active and whether or not it is in soft handoff. As shown in FIG. 1, base station 104a communicates with remote terminals 106a, 106b, 106c, and 106d, and base station 104b communicates with remote terminals 106d, 106e, and 106f.

In system 100, a system controller 102 couples to base stations 104 and may further couple to a Public Switched Telephone Network (PSTN) or Packet Data Serving Node (PDSN). System controller 102 provides coordination and control for the base stations coupled to it. System controller 102 further controls the routing of telephone calls among remote terminals 106, and between remote terminals 106 and the users coupled to PSTN (e.g., conventional telephones), or PDSN (e.g. a web site on the Internet), via base stations 104. System controller 102 is also referred to as a Base Station Controller (BSC).

System 100 may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the "TIA/EIA-98-D Recommended Minimum Standard for Dual-Mode Wideband Spread Spectrum Cellular Mobile Station" (the IS-98 standard), (3) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (4) the standard offered by a consortium named "3rd Generation Partnership Project 2" (3GPP2) and embodied in a set of documents including Document Nos. C.S0002A, C.S0005-A, C.S0010-A, C.S0011-A and C.S0026 (the cdma2000 standard including 1x-EVDV), or some other standard. These standards are incorporated herein by reference.

The cdma2000 standard supports multiple configurations of supplemental channels. In an exemplary embodiment, a cdma2000 1xEV-DV reverse link supports a first supplemental channel (R-SCH1) and a second supplemental channel (R-SCH2).

FIG. 2 illustrates the rate combinations of a 1xEVDV reverse link supporting two supplemental channels R-SCH1 and R-SCH2, in accordance with the exemplary embodiment. FIG. 2 shows a table 200 of possible rate combinations that a base station 104 may use to transmit data to a remote terminal 106 on R-SCH1 and R-SCH2. R-SCH1 and RSCH2 of the exemplary embodiment support data rates of 0, 9.6, 19.2, 38.4, 76.8, 153.6, 307.2, 614.4 and 1024 kilobits per second (kbs). The transmission rate of R-SCH1 and the transmission rate of R-SCH2 form a rate combination. Each rate combination is identified by a rate combination indicator transmitted in every 20 ms frame. The rate combination indicator represents explicit rate information included as part of a variable rate frame that enables the receiver to recover the frame without resorting to exhaustive rate processing.

For example, rate combination 1 represents a data rate of zero kbs for R-SCH1 and zero kbs for R-SCH2. Rate combination 2 represents a data rate of 9.6 kbs for R-SCH1 and zero kbs for R-SCH2, and so forth, until rate combination 81 is used to represent a data rate of 1024 kbs for R-SCH1 and 1024 kbs for R-SCH2. A total of 7 bits per 20 ms frame are required to represent the 81 possible rate combinations for R-SCH1 and R-SCH2.

The 7 bits representing the rate combination indicator are transmitted at a cost in energy and data throughput. The bits must be carried on the reverse link exactly as the high data rate channel itself, and the bits must be reliable to reduce the possibility of erasure or mis-categorization, which lead to the loss of the data bits. Each of the 7 bits representing the rate combination indicator is transmitted at a cost of 50 bits per second in data throughput, related allocation of total transmit power, and related receive processing. Decreasing the rate combination indicator by 1 bit saves 50 bits per second.

FIG. 3 illustrates a novel reduced-bit rate indication combination table for R-SCH1 and R-SCH2, in accordance with the exemplary embodiment. FIG. 3 shows a table 300 where the 7-bit rate combination indicator of FIG. 2 is reduced to 6 bits by eliminating certain rate combinations. When a supplemental channel is not transmitting any data, no frames can be recovered by the receiver for that supplemental channel. Rate indication combinations can be eliminated when one or both supplemental channels are not transmitting data, or in other words, when R-SCH1 and/or R-SCH2 has a data rate of 0. Table 300 illustrates possible rate indication combinations of the exemplary embodiment when either one or both supplemental channels have a rate of 0, which are indicated by the value X (no explicit rate combination).

For example, rate combination 1 now represents a data rate of 9.6 kbs for R-SCH1 and 9.6 kbs for R-SCH2. Rate combination 2 represents a data rate of 19.2 kbs for R-SCH1 and 9.6 kbs for R-SCH2, and so forth, until rate combination 64 is used to represent a data rate of 1024 kbs for R-SCH1 and 1024 kbs for R-SCH2. A total of only 6 bits, rather than 7 bits, per 20 ms frame are now required to represent the 64 possible rate indication combinations, rather than 81 possible rate indication combinations in FIG. 2, for R-SCH1 and R-SCH2. When one or both supplemental channels have a data rate of zero, the zero data rate is indicated to the receiver using an alternative bit rate indication combination as detailed in FIG. 4.

FIG. 4 illustrates novel use of the reduced-bit rate indication combinations shown in FIG. 3 in accordance with the exemplary embodiment. When one or both supplemental channels have a data rate of zero, the zero data rate is indicated to the receiver by using an alternative reduced-bit rate combination indicator rather than the eliminated combination (indicated by a value of X).

High data rate transmissions on the reverse link are typically scheduled and authorized by the base station 104. Authorization typically takes place once for a predetermined amount of time, or number of frames. In one embodiment, authorization is good for ten 20 ms frames. The base station 104 authorizes the remote terminal 106 to transmit at a certain rate, or at a certain rate and below.

FIG. 4 shows a rate indicator combination table 400 in which the base station 104 has authorized the remote terminal 106 to transmit at a rate of 76.8 kbs on R-SCH1 and R-SCH2, in accordance with the exemplary embodiment. The base station authorization creates an authorization space, or authorized block region, of the rate indication combination table 400. In an exemplary embodiment, all rates up to the authorized rate are allowed. As a result, the authorized space 401 of the exemplary embodiment is outlined by dark lines in the table 400. The outlined authorized block region of allowable rate indication combinations includes rate combinations 1, 2, 3, 4, 9, 10, 11, 12, 17, 18, 19, 20, 25, 26, 27, and 28. Any rate combinations outside the authorized block are logically not allowed, or illegal. When the base station 106 transmits a rate combination in which one or both of the supplemental channel data rates is 0, the base station uses an alternative reduced-bit rate combination indicator from the disallowed region. For example, in one embodiment, the base station 106 transmits at a data rate of 76.8 kbs on R-SCH1 and zero kbs on R-SCH2. The base station 106 can send reduced-bit rate combination 36 (R-SCH1 76.8 kbs and R-SCH-2=153.6 kbs), 44 (R-SCH1= 76.8 kbs and R-SCH-2=307.2 kbs), 52 (R-SCH1 =76.8 kbs and R-SCH-2=614.4 kbs), or 60 (R-SCH1 =76.8 kbs and R-SCH-2=1024 kbs), in place of the eliminated combination. When the remote terminal 104 receives a rate combination indicator that is not allowed for one or both supplemental channels, the remote terminal will not try to recover frames on the channel where the base station has indicated an unauthorized rate. In another embodiment where both supplemental channels have a zero kbs data rate, the base station 106 can select any rate combination indicator inside the doubly illegal region 402 indicated by the dark dashed border.

Figure 9:
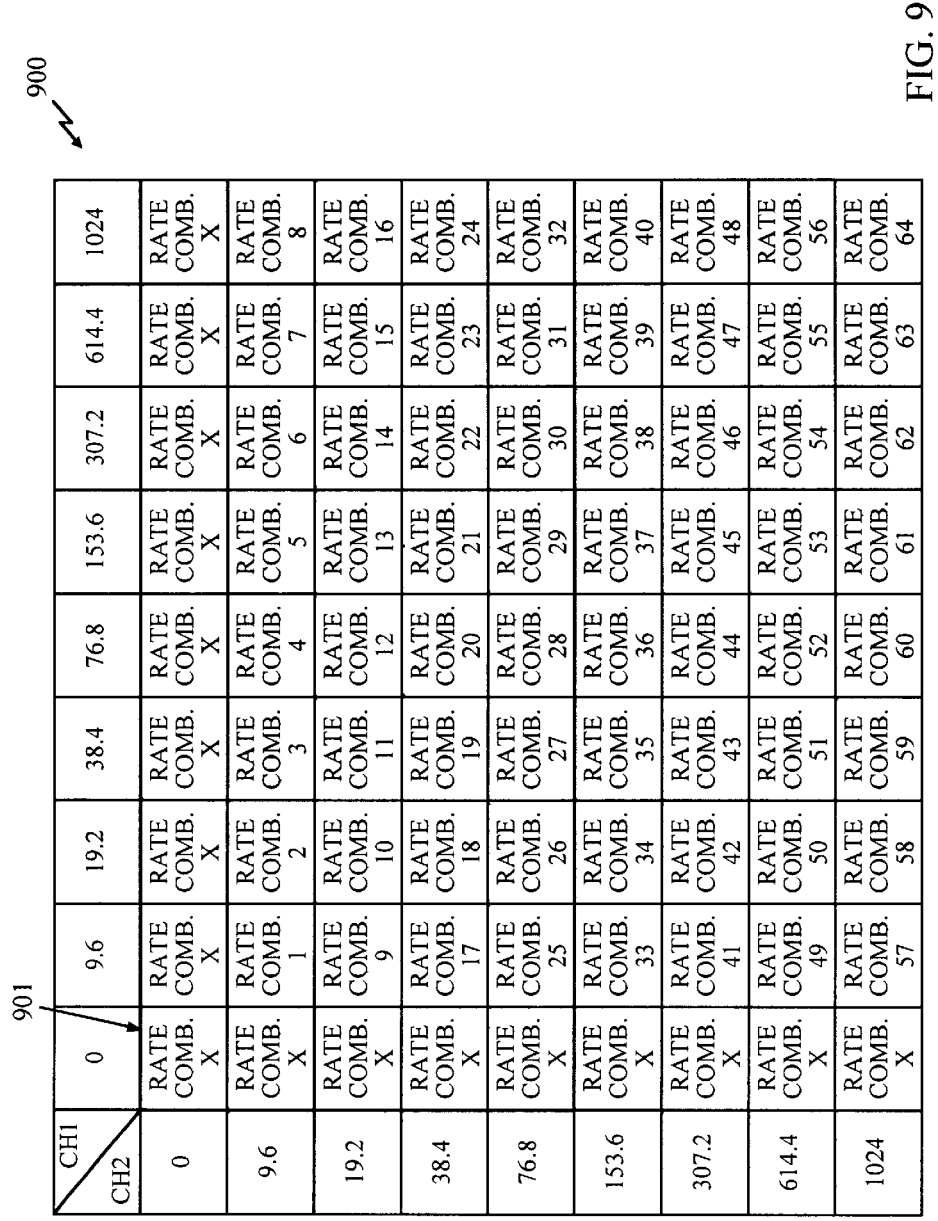
FIG. 9 illustrates a rate indication case where a channel is authorized to transmit at the maximum rate in accordance with an exemplary embodiment.

FIG. 9 illustrates a rate indication case in which a channel is authorized to transmit at the maximum rate in accordance with the exemplary embodiment. If the authorized rate for one or both R-SCHs is the maximum, (1024 kbps in this exemplary embodiment), there would be no illegal rate combination to indicate the case of zero rate on the channel whose authorization is equal to the maximum rate. The illegal rate combination method described above is complemented by the following scheme utilizing rate combination indicators that are the most easily distinguished from an erasure. An exemplary embodiment of a scheme utilizing rate combination indicators that are the most easily distinguished from an erasure are illustrated in table 900 of FIG. 9, where R-SCH2 is authorized to transmit at rates up to 76.8 kbps while R-SCH1 is authorized to transmit the maximum rate of 1024 kbps. Dark lines mark the corresponding authorized region 901. In the case where the maximum rate is authorized, a rate combination indicator is chosen so that the indicated rate on the channel that is authorized to transmit up to the maximum rate (RSCH-1 in this example) is the maximum rate. For example, if the actual rate combination is (R-SCH1 =0 kbps and R-SCH2 =19.2 kbps), then the rate combination indicator is set to 16 (R-SCH1 =1024 kbps and R-SCH2 =19.2 kbps). The receiver would most likely receive a good frame on R-SCH2 and none on R-SCH1. The outer loop at the receiver then measures the signal to noise and interference ratio on R-SCH1 to compare against a pre-determined threshold. This comparison is used to decide whether there is actual transmission on R-SCH1 and thus a need to increase the outer loop for that channel after a failed reception; or that there was no transmission and thus no outer loop modification are necessary. The maximum rate used in the rate combination indicator for the channel using no frame reduces the probability of miscategorization of that zero rate as an actually transmitted frame. This is because the threshold on signal to noise ratio is higher for higher data rates and is less likely for the measured value from the noise-only period to exceed.

In addition to improved data throughput, the use of an alternative reduced-bit rate combination indicator from the disallowed region when one or both of the supplemental channel data rates is zero also improves power control by eliminating confusion in the operation of the outer loop. Typically, if the receiver cannot recover frames, the receiver may assume an erasure has occurred and erroneously adjust the setpoint by increasing the target signal to noise ratio. Instead of attempting to recover frames on a zero kbs channel and affecting the outer loop, the disallowed rate combination notifies the receiver that erasures have not occurred. When a supplemental channel has a zero kbs data rate, and the base station 106 is using a rate combination indicating, for example, a data rate of 307.2 kbs, signal to noise detection circuitry can easily determine that an erasure has not occurred. If the rate indicator indicates that the data rate is high, the receiver expects more energy. If, instead, nothing is sent, then the receiver can more easily determine that an erasure has not occurred because the expected energy is not present.

Figure 5:
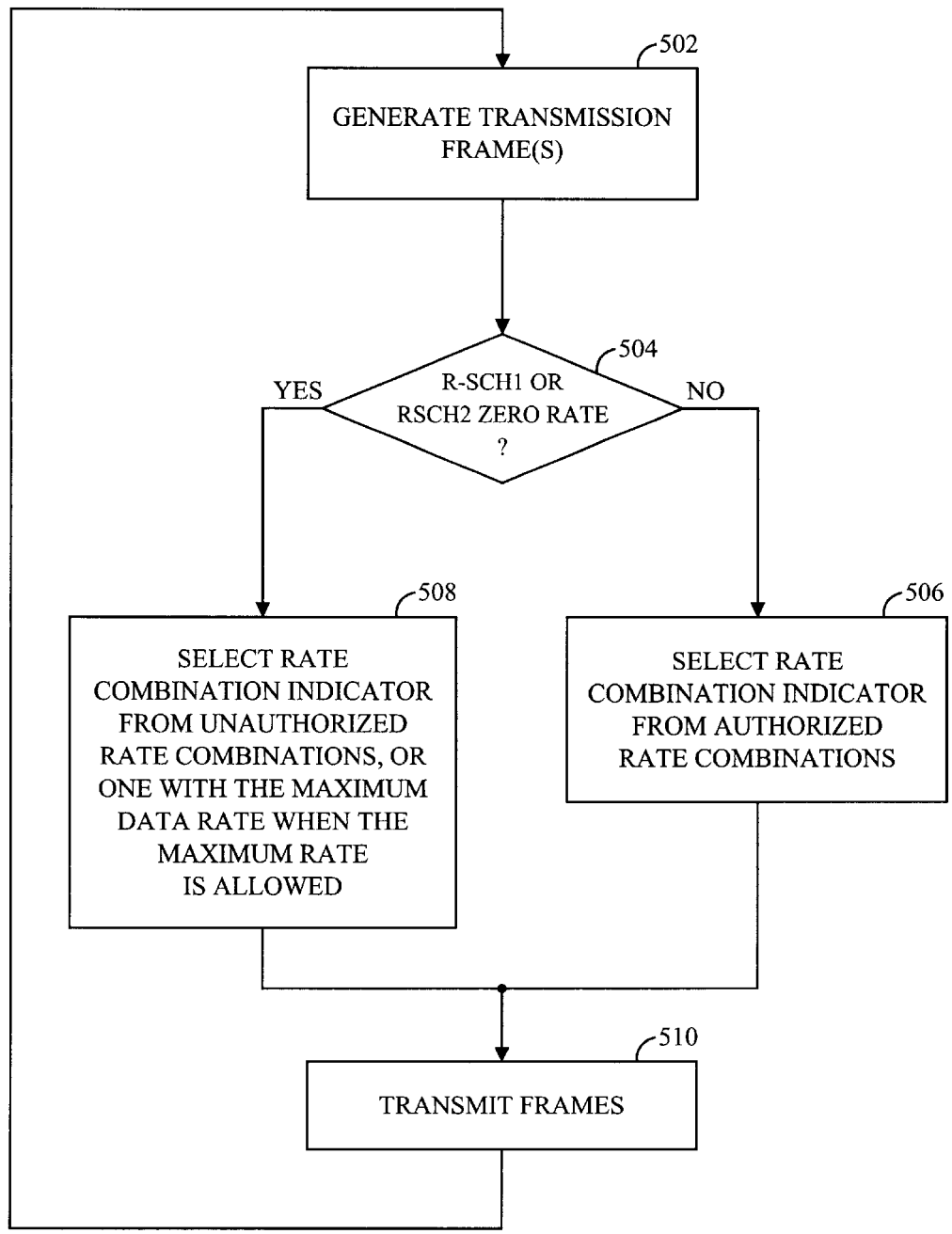
FIG. 5 is a flowchart illustrating steps of reduced-bit rate combination indication at a transmitter in accordance with an exemplary embodiment.

FIG. 5 is a flowchart 500 illustrating steps of reduced-bit rate combination indication at a transmitter in accordance with an exemplary embodiment. One skilled in the art will understand that ordering of steps illustrated in FIG. 5 is not limiting. The method is readily amended by omission or re-ordering of the steps illustrated without departing from the scope of the disclosed embodiments. The disclosed embodiments are described in the context of a CDMA system. However, the disclosed embodiments are equally applicable to other systems such as Personal Communications Systems (PCS), wireless local loop (WLL), private branch exchange (PBX), or other systems. Furthermore, systems utilizing other multiple access and multiplexing schemes such as TDM, TDMA, FDM, and FDMA, as well as other spread spectrum systems may employ the disclosed embodiments.

In step 502, a data frame, or packet, is generated for transmission. Control flow proceeds to step 504.

In step 504, the transmitter determines whether either supplemental channel of the exemplary embodiment has a zero kbs data rate. If neither channel has a zero kbs data rate, control flow proceeds to step 506 where the authorized rate combination is determined. Control flow then proceeds to step 510. If in step 504, either supplemental channel has a data rate of zero kbs, control flow proceeds to step 508 where an unauthorized rate combination is selected as detailed in FIG. 4, or the maximum rate is chosen for the zero rate for easy detection as detailed in FIG. 9. Control flow proceeds to step 510.

In step 510, the frame and rate combination indicator are transmitted. Steps 502–510 are repeated each 20 ms frame time.

Figure 6:
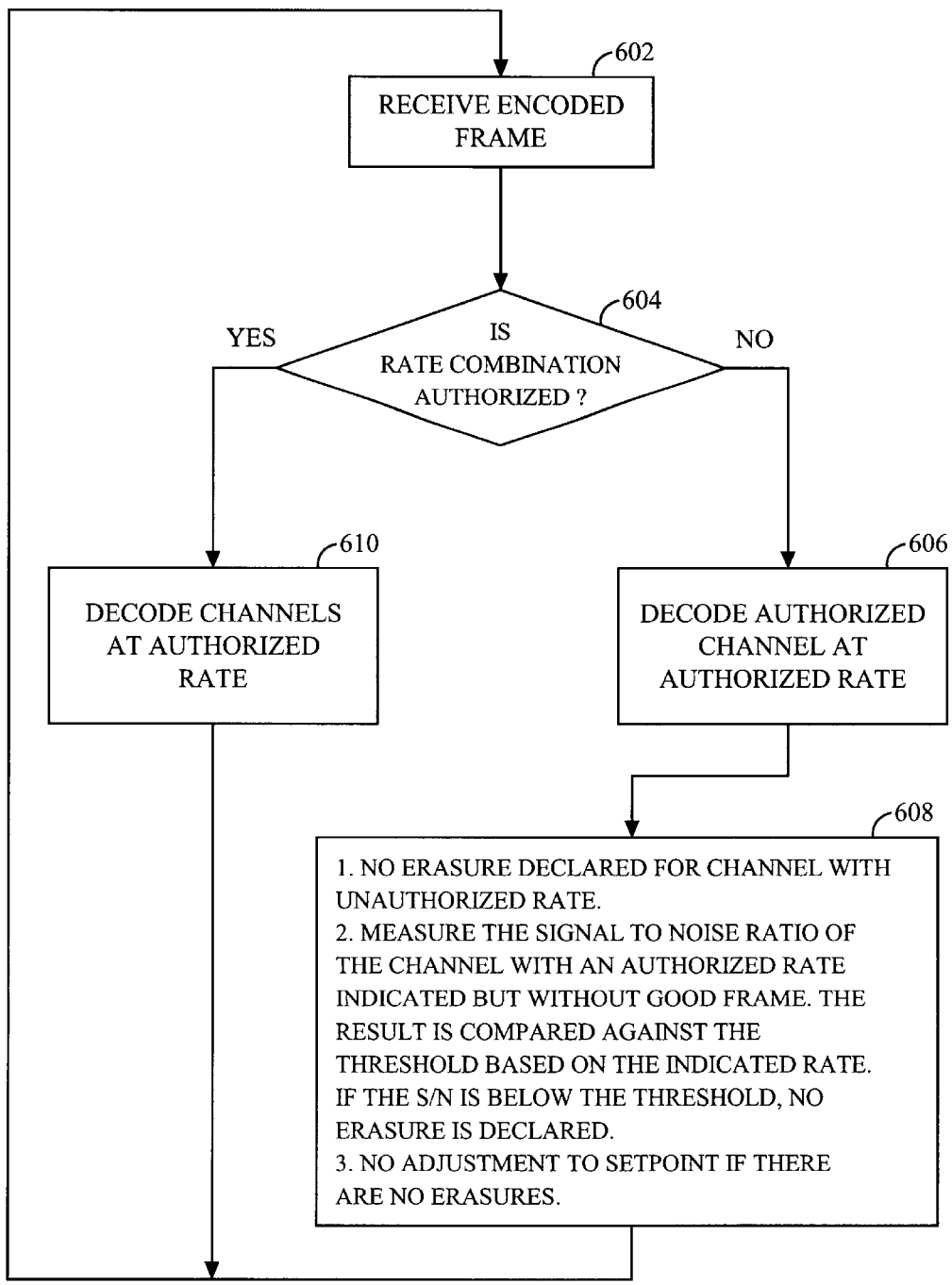
FIG. 6 is a flowchart illustrating steps of reduced-bit rate combination indication at a receiver in accordance with an exemplary embodiment.

FIG. 6 is a flowchart 600 illustrating steps of reduced-bit rate combination indication at a receiver in accordance with an exemplary embodiment. One skilled in the art will understand that ordering of steps illustrated in FIG. 6 is not limiting. The method is readily amended by omission or re-ordering of the steps illustrated without departing from the scope of the disclosed embodiments. The disclosed embodiments are described in the context of CDMA systems. However, the disclosed embodiments are equally applicable to other systems such as Personal Communications Systems (PCS), wireless local loop (WLL), private branch exchange (PBX), or other systems. Furthermore, systems utilizing other multiple access or multiplexing schemes such as TDM, TDMA, FDM, and FDMA, as well as other spread spectrum systems may employ the disclosed embodiments.

In step 602, a data frame, or packet, is received. Control flow proceeds to step 604.

In step 604, the receiver determines if the rate combination indicator is authorized. If the rate combination indicator is authorized, control flow proceeds to step 610 where the channels are decoded at the authorized rates. Control flow then proceeds to step 602.

If in step 604, the rate combination indicator is unauthorized, control flow proceeds to step 606 where any channel of the combination with an authorized rate is decoded at the indicated rate, and control flow proceeds to step 608.

In step 608, no erasures are declared for the channel with an unauthorized rate indicator, also, for channels with an authorized rate indicator but no correctly detected frames, signal to noise ratio(s) are measured and compared against thresholds set according to the indicated data rates, no erasure is declared for signal to noise ratio below that threshold. No adjustment is made to the setpoint if no erasures are declared. Control flow proceeds to step 602. Steps 602–610 are repeated for each received each frame.

Figure 7:
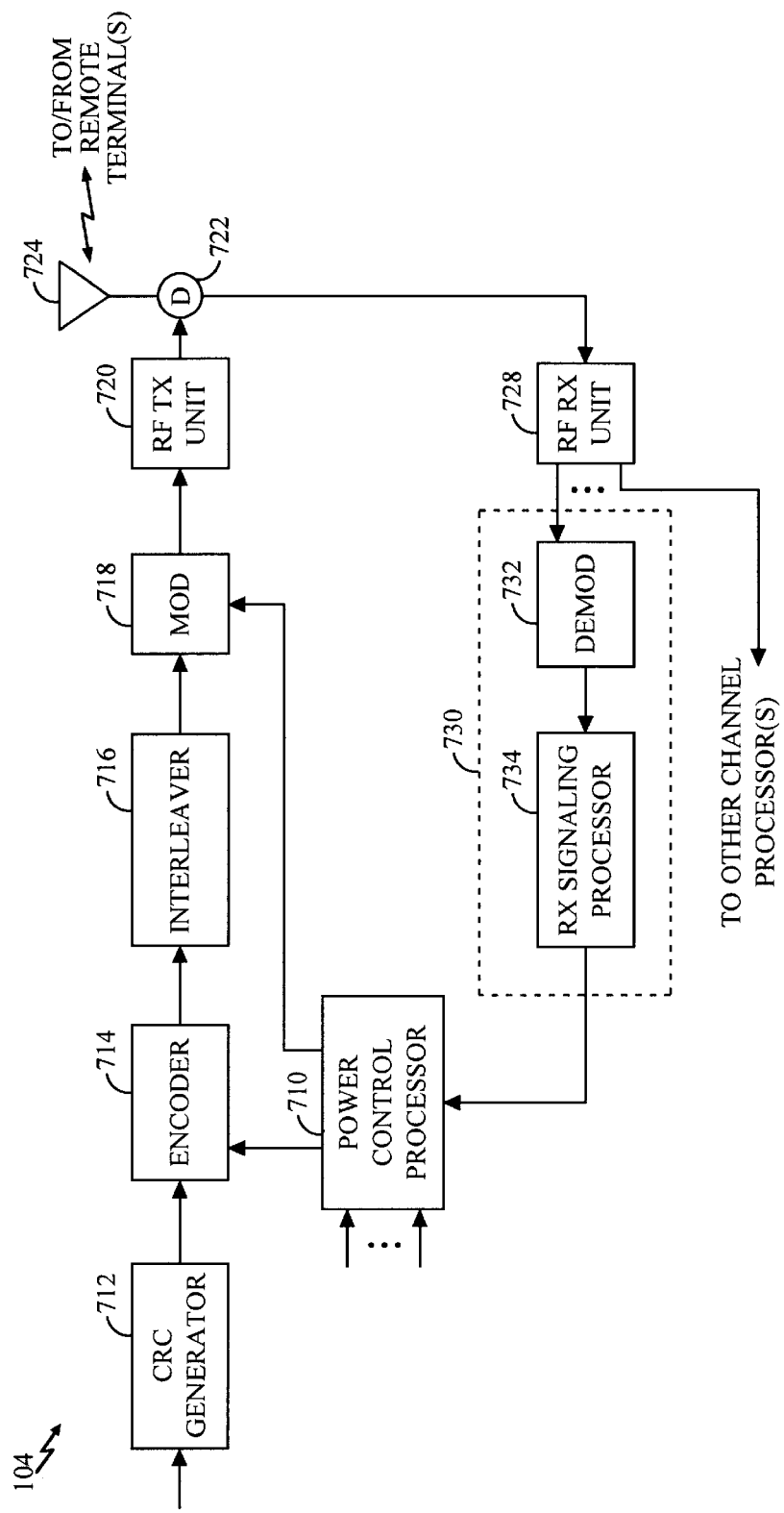
FIG. 7 is a block diagram of an embodiment of a base station apparatus capable of supporting the disclosed embodiments.

FIG. 7 is a block diagram of an embodiment of base station 104, which is capable of implementing the disclosed embodiments on the forward link. On the forward link, data is provided to a cyclic redundancy check (CRC) generator 712, which generates and appends a set of CRC bits for each frame (or packet) of data. CRC generator 712 may further format the frame into a particular format defined by the exemplary CDMA system. The formatted frame is then encoded with a reduced-bit rate combination indicator by an encoder 714 using a particular coding scheme, which may include a convolutional code, a Turbo code, a block code, or a combination thereof. The encoded frame is interleaved (i.e., reordered) by interleaver 716 in accordance with a particular interleaving scheme also defined by the system.

The interleaved data is provided to a modulator (MOD) 718 and further processed (e.g., covered with a cover code, spread with short PN sequences, scrambled with a long PN sequence assigned to the recipient remote terminal, and so on). The modulated data is then provided to an RF TX unit 720 and conditioned (e.g., converted to one or more analog signals, amplified, filtered, quadrature modulated, and so on) to generate a forward link signal. The forward link signal is routed through a duplexer (D) 722 and transmitted via an antenna 724 to the remote terminal(s).

Although not shown in FIG. 7 for simplicity, base station 104 is capable of processing and transmitting data on one or more forward channels to a remote terminal. The processing (e.g., encoding, interleaving, covering, and so on) for each forward channel may be different from that of other forward channel(s). The reverse link signal is received by antenna 724, routed through duplexer 722, and provided to an RF receiver unit 728. RF receiver unit 728 conditions (e.g., downconverts, filters, and amplifies) the received signal and provides a conditioned reverse link signal for each remote terminal being received. A channel processor 730, comprised of a Demodulator 732 and a Receive Signal Processor 734, receives and processes the conditioned signal for a particular remote terminal to recover the transmitted data and power control information. A power control processor 710 receives the power control information (e.g., any combination of power control commands, erasure indicator bits, and quality indicator bits) and generates one or more signals used to adjust the transmit power of one or more transmissions to the remote terminal.

Figure 8:
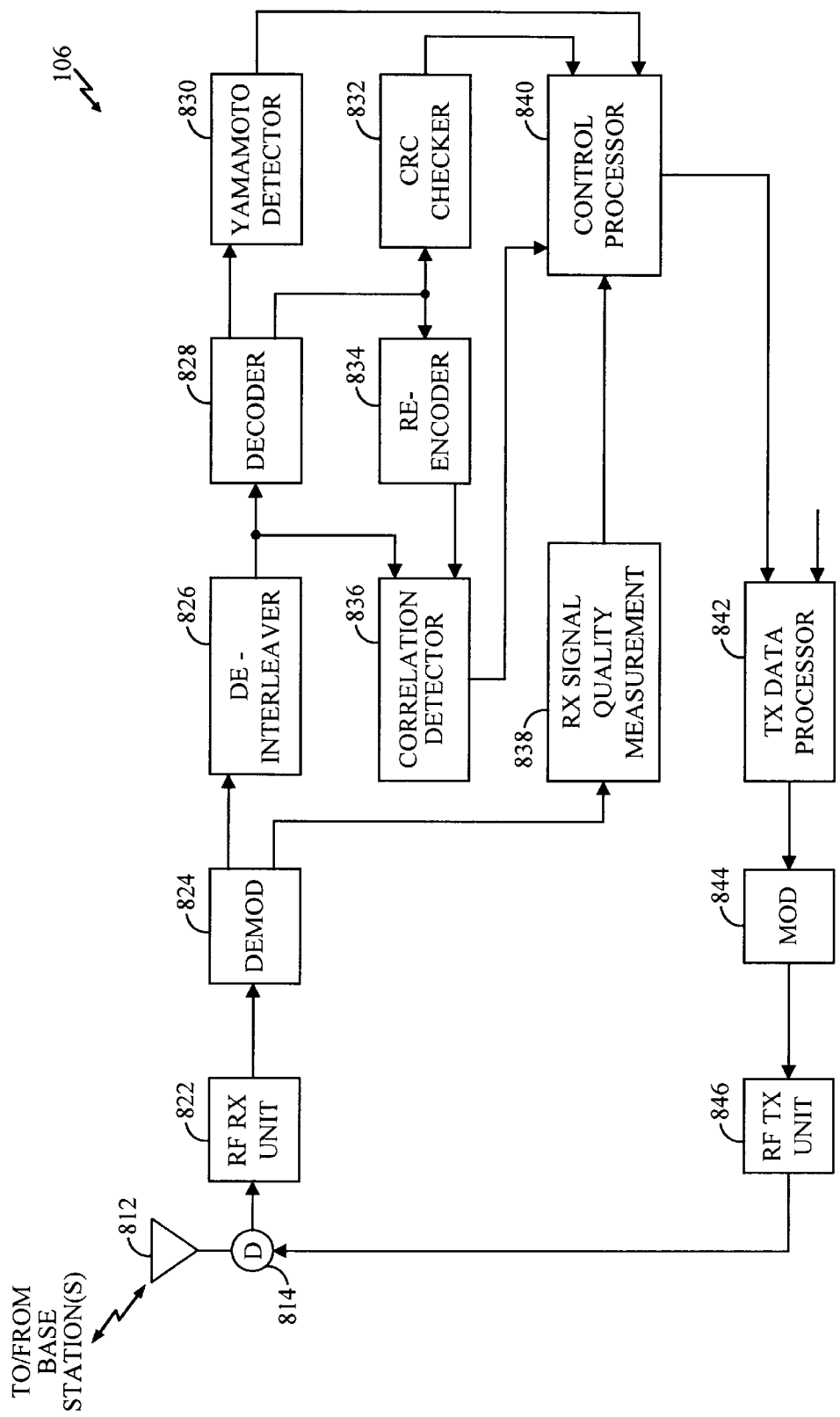
FIG. 8 is a block diagram of an embodiment of a remote terminal apparatus capable of supporting the disclosed embodiments.

FIG. 8 is a block diagram of an embodiment of remote terminal 106, which is capable of implementing the disclosed embodiments on the forward link. The forward link signal is received by an antenna 812, routed through a duplexer 814, and provided to an RF receiver unit 822. RF receiver unit 822 conditions (e.g., filters, amplifies, downconverts, and digitizes) the received signal and provides samples. A demodulator (DEMOD) 824 receives and processes (e.g., despreads, decovers, and pilot demodulates) the samples to provide recovered symbols. Demodulator 824 may implement a rake receiver that processes multiple instances of the received signal and generates combined recovered symbols. The recovered symbols are deinterleaved by a deinterleaver 826 in accordance with a deinterleaving scheme complementary to the interleaving scheme used at the base station 104.

A decoder 828 decodes the deinterleaved symbols in accordance with a decoding scheme complementary to the encoding scheme used at the base station 104. The decoding scheme determines the data rate using the reduced-bit rate combination indicator. The decoded data for each frame is provided to a CRC checker 832, which determines whether the frame was decoded correctly or in error based on the appended CRC bits. For each received and decoded frame, CRC checker 832 provides a frame status indicative of whether the frame was erased or properly decoded. If the reduced-bit rate combination indicator indicates zero rate frames, rather than erasures, no adjustment is made to the outerloop setpoint. On the reverse link, data is processed (e.g., formatted, encoded) by a transmit (TX) data processor 842, further processed (e.g., covered, spread) by a modulator (MOD) 844, and conditioned (e.g., converted to analog signals, amplified, filtered, quadrature modulated, and so on) by an RF TX unit 846 to generate a reverse link signal. Information from control processor 840 may be multiplexed with the processed data by TX data processor 842 or modulator 844. The reverse link signal is routed through duplexer 814 and transmitted via antenna 812 to one or more base stations 104. Decoded data bits in decoded frames are provided from decoder 828 to a re-encoder 834, which re-encodes the data with the same convolutional encoder used at the transmitter. A correlation detector 836 receives generated coded bits from re-encoder 834 and the received symbols from deinterleaver 826. The output of demodulator 824 may be provided to an RX signal quality measurement unit 838 that estimates the quality of the received transmission.

As noted above, on the forward link, the capacity of each base station is limited by the total transmit power. To provide the desired level of performance and increase system capacity, the transmit power of each transmission from the base station 104 may be controlled to be as low as possible to reduce power consumption while still maintaining the desired level of performance for the transmission. If the received signal quality at the remote terminal is too poor, the likelihood of correctly decoding the transmission decreases and performance may be compromised (e.g., a higher FER). Conversely, if the received signal quality is too high, the transmit power level is also likely to be too high and an excessive amount of transmit power may have been unnecessarily used for the transmission, which reduces system capacity and may further cause extra interference to transmissions from other base stations.

On the reverse link, each transmitting remote terminal acts as interference to other active remote terminals in the system. The reverse link capacity is limited by the total interference that each remote terminal experiences from other transmitting remote terminals. To reduce interference and increase the reverse link capacity, the transmit power of each remote terminal is typically controlled to reduce interference to other transmitting remote terminals while still maintaining the desired level of performance.

The power control techniques of the disclosed embodiments can be used for various wireless communication systems, and may be employed for the forward and/or reverse links. For example, the power control techniques described herein may be used for CDMA systems that conform to the cdma2000 standard and its extensions (i.e. IS-2000, IS856, 1×EV-DV), the W_CDMA standard, some other standard, or a combination thereof.

In a variable rate wireless communication system, communicating the data rate and configuration of the transmission to the receiver serves to facilitate the reception and to enhance the receiver performance. Receiver performance is enhanced by a lower probability of rate mis-categorization and a higher probability of correct data reception. For example, the reverse links of IS-2000, W_CDMA, IS-856, or 1×EV-DV systems would utilize different data rates or different transmission formats to get the most efficient use of the channel resources. The appropriate data rate to use can be scheduled by the infrastructure ahead of time using a specific or an indirect method. These methods include notifying each remote terminal 106 of the reverse link data rate to use in a layer 3 message, or using a broadcast to indicate the maximum data rate to every remote terminal 106 in a given sector or geographic region.

The data rate can still be ambiguous after these communications from the base station 104 to the remote terminal 106 because the remote terminal 106 might be unable to transmit at the assigned rate due to lack of power (closed loop power control feedback from the base station 104 would indicate the proper level of transmission to the remote terminal 106), lack of data (the remote terminal 106 runs out of bits to transmit at the assigned rate, the arrival of bits slows down, stops, or some of the bits in the buffer of the remote terminal 106 expire), or other reasons. To enhance the receiver performance, a reduced-bit rate combination indicator can be used to communicate the actual data rate and configuration simultaneously with the data channel. If this channel or signal is received correctly, it is not necessary for the receiver to try many different rate hypotheses, which, in turn, increases the correct detection and correct decoding probability, and reduces the processing load and power consumption. There is a specific benefit for communicating the zero rate (no transmission) to the receiver, being that when a zero rate is used, the decoder is not likely to produce false erasures. A false erasure can potentially cause various types of reduced performance by the receiver. One type of reduced performance occurs if the outer loop set point is increased in response to a false erasure. Another type of reduced performance occurs if misleading channel quality monitoring causes a false erasure, also increasing the frame erasure statistics unnecessarily.

The rate indicator channel itself consumes power at the transmitter. As a result, it is desirable to use the lowest data rate on that channel to convey the rate indicator information without confusing the receiver. In the disclosed embodiments, the eliminated zero rate indication is replaced by a reduced-bit indication of a non-zero rate channel configuration. The rate combination indicator is selected so that it is either logically not possible (outside of the authorized rate space previously assigned by the transmitter), or selected so that the receiver can easily differentiate the zero rate from the indicated rate by energy level detection.

Thus, a novel and improved method and apparatus for enhanced rate determination in high data rate wireless communications systems have been described. Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CDROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a remote terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a variable rate wireless communication system having at least a first channel and a second channel, a method for explicitly indicating data rate information comprising:

generating a frame of data from data present on the at least first and second channels;

determining a set of all possible data rate combinations for the at least first and second channels;

determining a subset of authorized data rate combinations and a subset of unauthorized data rate combinations from the set of all possible data rate combinations;

selecting a data rate combination to represent the data present on the at least first and second channels from the subset of unauthorized data rate combinations to represent a data rate combination with at least one zero data rate; and transmitting an indicator of the selected data rate combination and the frame of data.

2. The method of claim 1 wherein the wireless communications system is a 1×EV-DV system.

3. The method of claim 1 wherein the at least first and second channels are a first reverse link supplemental channel and a second reverse link supplemental channel.

4. The method of claim 1 wherein the set of all possible data rate combinations is generated from possible data rates of 0, 9.6, 19.2, 38.4, 76.8, 153.6, 307.2, 614.4 and 1024 kilobits per second for each channel.

5. In a variable rate wireless communication system having at least a first channel and a second channel, a method for explicitly indicating data rate information comprising:

generating a frame of data from data present on the at least first and second channels;

determining a set of all possible data rate combinations for the at least first and second channels;

determining a subset of authorized data rate combinations and a subset of unauthorized data rate combinations from the set of all possible data rate combinations;

selecting a data rate combination with a maximum data rate to represent a channel data rate combination with a zero data rate when the maximum rate is authorized on the zero rate channel; and transmitting an indicator of the selected data rate combination and the frame of data.

6. The method of claim 5 wherein the wireless communications system is a 1×EV-DV system.

7. The method of claim 5 wherein the at least first and second channels are a first reverse link supplemental channel and a second reverse link supplemental channel.

8. The method of claim 5 wherein the set of all possible data rate combinations is generated from possible data rates of 0, 9.6, 19.2, 38.4, 76.8, 153.6, 307.2, 614.4 and 1024 kilobits per second for each channel.

9. A computer readable medium having instructions stored thereon to cause computers in a variable rate wireless communication system having at least a first channel and a second channel to perform a method for explicitly indicating data rate information comprising:

generating a frame of data from data present on the at least first and second channels;

determining a set of all possible data rate combinations for the at least first and second channels;

determining a subset of authorized data rate combinations and a subset of unauthorized data rate combinations from the set of all possible data rate combinations;

selecting a data rate combination to represent the data present on the at least first and second channels from the subset of unauthorized data rate combinations to represent a data rate combination with at least one zero data rate; and transmitting an indicator of the selected data rate combination and the frame of data.

10. The computer readable medium of claim 9 wherein the wireless communications system is a 1×EV-DV system.

11. The computer readable medium of claim 9 wherein the at least first and second channels are a first reverse link supplemental channel and a second reverse link supplemental channel.

12. The computer readable medium of claim 9 wherein the set of all possible data rate combinations is generated from possible data rates of 0, 9.6, 19.2, 38.4, 76.8, 153.6, 307.2, 614.4 and 1024 kilobits per second for each channel.

13. A computer readable medium having instructions stored thereon to cause computers in a variable rate wireless communication system having at least a first channel and a second channel to perform a method for explicitly indicating data rate information comprising:
- generating a frame of data from data present on the at least first and second channels;
- determining a set of all possible data rate combinations for the at least first and second channels;
- determining a subset of authorized data rate combinations and a subset of unauthorized data rate combinations from the set of all possible data rate combinations;
- selecting a data rate combination with a maximum data rate to represent a channel data rate combination with a zero data rate when the maximum rate is authorized on the zero rate channel; and
- transmitting an indicator of the selected data rate combination and the frame of data.

14. The computer readable medium of claim 13 wherein the wireless communications system is a 1×EV-DV system.

15. The computer readable medium of claim 13 wherein the at least first and second channels are a first reverse link supplemental channel and a second reverse link supplemental channel.

16. The computer readable medium of claim 13 wherein the set of all possible data rate combinations is generated from possible data rates of 0, 9.6, 19.2, 38.4, 76.8, 153.6, 307.2, 614.4 and 1024 kilobits per second for each channel.

17. In a variable rate wireless communication system having at least a first channel and a second channel, a method for decoding received data using explicit data rate indication information comprising:
- receiving a frame of data comprising data present on the at least first and second channels and a rate combination indictor indicating a data rate for the at least first and second channels;
- determining a set of all possible data rates for the at least first and second channels;
- determining a subset of authorized data rates and a subset of unauthorized data rates from the set of all possible data rates for the at least first and second channels; and
- processing a channel having an unauthorized data rate as a zero rate channel without declaring an erasure or adjusting a setpoint.

18. The method of claim 17 wherein the wireless communications system is a 1×EV-DV system.

19. The method of claim 17 wherein the at least first and second channels are a first reverse link supplemental channel and a second reverse link supplemental channel.

20. The method of claim 17 wherein the set of all possible data rates comprises 0, 9.6, 19.2, 38.4, 76.8, 153.6, 307.2, 614.4 and 1024 kilobits per second for the at least first and second channel.

21. In a variable rate wireless communication system having at least a first channel and a second channel, a method for decoding received data using explicit data rate indication information comprising:
- receiving a frame of data comprising data present on the at least first and second channels and a rate combination indictor indicating a data rate for the at least first and second channels;
- determining a set of all possible data rates for the at least first and second channels;
- determining a subset of authorized data rates and a subset of unauthorized data rates from the set of all possible data rates for the at least first and second channels;
- processing a channel having an authorized data rate and no recovered data by measuring the signal to noise ratio and comparing the ratio to a threshold determined by the indicated rate; and
- processing a channel where the ratio is below the threshold as a zero rate channel, without declaring an erasure or adjusting the setpoint.

22. The method of claim 21 wherein the wireless communications system is a 1×EV-DV system.

23. The method of claim 21 wherein the at least first and second channels are a first reverse link supplemental channel and a second reverse link supplemental channel.

24. The method of claim 21 wherein the set of all possible data rates comprises data rates of 0, 9.6, 19.2, 38.4, 76.8, 153.6, 307.2, 614.4 and 1024 kilobits per second for each channel.

25. A computer readable medium having instructions stored thereon to cause computers in a variable rate wireless communication system having at least a first channel and a second channel to perform a method for decoding received data using explicit data rate indication information comprising:
- receiving a frame of data comprising data present on the at least first and second channels and a rate combination indictor indicating a data rate for the at least first and second channels;
- determining a set of all possible data rates for the at least first and second channels;
- determining a subset of authorized data rates and a subset of unauthorized data rates from the set of all possible data rates for the at least first and second channels; and
- processing a channel having an unauthorized data rate as a zero rate channel, without declaring an erasure or adjusting a setpoint.

26. The computer readable medium of claim 25 wherein the wireless communications system is a 1×EV-DV system.

27. The computer readable medium of claim 25 wherein the at least first and second channels are a first reverse link supplemental channel and a second reverse link supplemental channel.

28. The computer readable medium of claim 25 wherein the set of all possible data rates comprises 0, 9.6, 19.2, 38.4, 76.8, 153.6, 307.2, 614.4 and 1024 kilobits per second for the at least first and second channel.

29. A computer-readable medium having instructions stored thereon to cause computers in a variable rate wireless communication system having at least a first channel and a second channel to perform a method for decoding received data using explicit data rate indication information comprising:
- receiving a frame of data comprising data present on the at least first and second channels and a rate combination indictor indicating a data rate for the at least first and second channels;
- determining a set of all possible data rates for the at least first and second channels;
- determining a subset of authorized data rates and a subset of unauthorized data rates from the set of all possible data rates for the at least first and second channels;
- processing a channel having an authorized data rate and no recovered data by measuring the signal to noise ratio and comparing the ratio to a threshold determined by the indicated rate; and
- processing a channel where the ratio is below the threshold as a zero rate channel, without declaring an erasure or adjusting a setpoint.

30. The computer readable medium of claim 29 wherein the wireless communications system is a 1xEV-DV system.

31. The computer readable medium of claim 29 wherein the at least first and second channels are a first reverse link supplemental channel and a second reverse link supplemental channel.

32. The computer readable medium of claim 29 wherein the set of all possible data rates comprises data rates of 0, 9.6, 19.2, 38.4, 76.8, 153.6, 307.2, 614.4 and 1024 kilobits per second for each channel.

33. A base station capable of encoding a signal for transmission comprising:
   a transmitter, the transmitter being configured to transmit variable rate data signals between a base station and a remote terminal; and
   a processor communicatively coupled to the transmitter and configured to:
   generate a frame of data from data present on the at least first and second channels;
   determine a set of all possible data rate combinations for the at least first and second channels;
   determine a subset of authorized data rate combinations and a subset of unauthorized data rate combinations from the set of all possible data rate combinations;
   select a data rate combination to represent the data present on the at least first and second channels from the subset of unauthorized data rate combinations to represent a data rate combination with at least one zero data rate;
   select a data rate combination with a maximum data rate to represent a channel data rate combination with a zero data rate when the maximum rate is authorized on the zero rate channel; and
   transmit an indicator of the selected data rate combination and the frame of data.

34. The base station of claim 33 wherein the variable rate signal is a 1xEV-DV signal.

35. The base station of claim 33 wherein the at least first and second channels are a first reverse link supplemental channel and a second reverse link supplemental channel.

36. The base station of claim 33 wherein the set of all possible data rate combinations is generated from possible data rates of 0, 9.6, 19.2, 38.4, 76.8, 153.6, 307.2, 614.4 and 1024 kilobits per second for each channel.

37. A remote terminal capable of receiving a transmitted signal comprising:
   a receiver, the receiver being configured to receive variable rate data signals from a base station; and
   a processor communicatively coupled to the transmitter and configured to:
   receive a frame of data comprising data present on the at least first and second channels and a rate combination indictor indicating a data rate for the at least first and second channels;
   determine a set of all possible data rates for the at least first and second channels;
   determine a subset of authorized data rates and a subset of unauthorized data rates from the set of all possible data rates for the at least first and second channels;
   process a channel having an unauthorized data rate as a zero rate channel, without declaring an erasure or adjusting a setpoint;
   process a channel having an authorized data rate and no recovered data by measuring the signal to noise ratio and comparing the ratio to a threshold determined by the indicated rate; and
   process a channel where the ratio is below the threshold as a zero rate channel, without declaring an erasure or adjusting a setpoint.

38. The remote terminal of claim 37 wherein the wireless communications system is a 1xEV-DV system.

39. The remote terminal of claim 37 wherein the at least first and second channels are a first reverse link supplemental channel and a second reverse link supplemental channel.

40. The remote terminal of claim 37 wherein the set of all possible data rates comprises data rates of 0, 9.6, 19.2, 38.4, 76.8, 153.6, 307.2, 614.4, and 1024 kilobits per second for each channel.

41. A variable rate wireless communications system comprising:
   a base station for encoding and transmitting data with a reduced-bit rate combination indicator explicitly indicating the rate of the data; and
   a remote terminal for receiving and decoding data using the reduced-bit rate combination indicator without declaring erasures or adjusting a setpoint when processing a channel with a zero data rate.

42. The system of claim 41 wherein the wireless communications system is a 1xEV-DV system.

43. The system of claim 41 wherein the base station encodes and transmits at least a first reverse link supplemental channel and a second reverse link supplemental channel.

44. The system of claim 41 wherein the reduced-bit rate combination indicator indicates a set of all possible data rate combinations generated from data rates comprising 0, 9.6, 19.2, 38.4, 76.8, 153.6, 307.2, 614.4 and 1024 kilobits per second.

* * * * *